United States Patent Office 3,170,916
Patented Feb. 23, 1965

3,170,916
METHOD OF PRODUCING DURABLE SAPONINE CONTAINING EXTRACTS FROM HORSE CHESTNUT AND PRODUCTS OBTAINED THEREFROM
Kurt Dziengel, Berlin-Steglitz, Germany, assignor to Chemische Fabrik Tempelhof, Preuss & Temmler, Berlin-Tempelhof, Germany
No Drawing. Filed Feb. 19, 1962, Ser. No. 174,300
12 Claims. (Cl. 260—210.5)

The invention relates to a method for producing durable horse-chestnut extracts containing saponine.

The seeds of the horse chestnut (*Aesculus hippocastanum*) contains substances which have been known for a long time to have valuable technical and therapeutical properties. They have been used already in popular medicine, processed into ointments, and used as aids in the resorption of medicaments which are difficult to resorb and as hair-removing agents. These substances have also been added to tooth-pastes, mouth-washes, hair-restorers and washing agents. Furthermore, the valuable therapeutical properties have been used particularly against the symptoms of the complex of venous stasis in the form of a drop solution, for application per os, as ointment, dragees and suppositories.

However, there was still the problem of carrying the active agents in suitable form to the required place. Aqueous extracts are particularly liable to decomposition by microorganisms and fermentive processes. The ferments are present in the seed together with the starting products of tanning substances, developing very undesirable, dark brown dyes during the manufacture and storage. Although the durability may be improved by preparing ointments from pre-purified extracts, the fatty and emulgated constituents of the ointment obstruct the pores and prevent the deep penetration of the active agents and a convincing therapeutical effect.

In this respect, it is also a disadvantage that the active agents form a colloidal complex which is difficult to separate and is unable to diffuse in aqueous solution across a semi-permeable membrane.

It was therefore necessary to apply the active agents to the body either per os, such as dragees, or by injection.

The injection is faced with the disadvantage of the strong hemolitic effect of the saponine (escine). There are, therefore, numerous methods for removing the saponine, for example, by precipitation with cholesterine or phytosterines. Also partial decomposition to prosapogenines is used, which have no longer a hemolytic effect. In addition, there are also known methods for separating the escine in pure form from suitable extract solutions, by producing an acidic pH value. These processes have been used particularly for preparing dry preparations which are dissolved immediately prior to the injection. It is also known to keep the extract of horse chestnut seeds substantially free from disturbing impurities, such as sugar, starch, albumen and tannic compounds by the substantial exclusion of water. This method was also used for producing dry or separated purified saponine. Saponine extracts with deep-acting transcutane effects made from horse-chestnut seeds in commercial form are not yet known.

It is, therefore, the object of the invention to provide a method of producing durable saponine extracts from horse chestnuts with deep-acting transcutane effects and with a wide range of application.

It has been found that the capacity to diffuse through semi-permeable membranes, and especially living skin, of active agents which may be extracted from horse-chestnut seeds by restricting the water content, may be substantially improved by adding to the extract, during or after the extraction, a polar organic liquid which is completely miscible with the extract and has preferably not more than 5 and especially three carbon atoms in the molecule, and a higher boiling point than water. Horse-chestnut seed extracts which are substantially free from water-soluble impurities and comprise liquids of this kind, have a surprisingly strong deep-acting, transcutane effect; for example, the quick disappearance of unesthetic small venes visible through the skin, and the cosmetically valuable and desirable tightening of the skin could be observed. Moreover, some unpleasant skin blemishes, such as acne vulgaris, could be made to disappear rapidly, and also the known therapeutical effects are accelerated and made more deep-acting by external application.

It was found that the liquid additive should be preferably an organic solvent, containing at least two OH groups in the molecule and more particularly propylene glycol.

Using this knowledge, the solvent to be added according to the invention may be used already during the extraction by extracting the horse-chestnut seed directly with these solvents, for example, propylene glycol. By using the known counter-current extraction methods, it is possible to produce extracts, saturated with the active agents. Here, it is of special advantage that propylene glycol has an extraordinarily high dissolving power for the active agents under discussion, especially for saponine, as well as for flavonoles and phosphatides, whilst the solubility for the undesirable impurities is extremely low.

In order to prevent losses of the comparatively expensive propylene glycol in the remanent extracted horse-chestnut seeds, the extraction may preferably be preceded by an extraction of the practically anhydrous horse-chestnut material with anhydrous methanol, carried out at temperatures below 30° C., and more preferably below 0° C. Then the methanol is removed and the extract is dissolved in a mixture of a monovalent alcohol with 2 or 3 carbons, some water, and propylene glycol.

It has also been found useful to extract the horse-chestnut material which may have been prepared by usual methods such as peeling and/or chipping and/or drying and/or degreasing and/or fine grinding, with a mixture of a monovalent alcohol with 2 or 3 carbons, propylene glycol and water, wherein the water content is so limited that the extract remains practically free from albumen and tannins.

The surprising fact that horse-chestnut seed extracts containing the additives according to the invention, have a higher diffusibility may be seen not only from the surprising transcutane therapeutical depth effect, but may also be detected by laboratory tests. It is known that, in order to remove undesirable free sugar and the like, the dialysis of aqueous solutions of horse-chestnut extracts may be used. This process uses the colloidal properties of the aqueous solution of saponines. If the dialysis is effected in the presence of propylene glycol, also the saponine is found to diffuse.

The invention will be further described, by way of example, with reference to some examples showing the manufacture of the horse-chestnut extracts containing saponine according to the invention.

EXAMPLE 1

The starting material was horse-chestnut seed meal produced from unpeeled chestnuts and dried to a water content of not more than 5%. 100 g. of this dry meal is tamped in layers in a glass extraction column, impregnated in layers with anhydrous methanol, in order to obtain uniform wetting and to prevent the column from being clogged by sirup-like substances. The content of the column is then extracted with further anhydrous methanol so that the total clear extract amounts to 300 cc. The extract is then concentrated in a water bath at atmospheric pressure to about 70% dry content and then the remaining methanol is removed under a vacuum at 40–60° C. by the gradual addition of 30 cc. water. The warm extract is allowed to stand and the co-extracted seed oil is quantitatively separated. The oil-free extract contains, according to the grade of the seed, 15–25 g. dry substance. It is soluble without residue in water and 70% aqueous ethanol or 70% aqueous isopropanol.

A part of this extract is mixed with aqueous ethanol or isopropanol and with propylene glycol so as to produce a 100 cc. solution, containing 5% dry extract with an HJ of 50,000, 10% propylene glycol and the remainder being 70% ethanol or isopropanol. The resulting, slightly yellow-to-brownish solution may be applied for therapeutical or cosmetic purposes to the skin and leaves after short embrocation a slightly sticky layer which quickly disappears.

Although this is less efficient, the propylene glycol may also be replaced by glycerine, ethylene glycol, 1,3-butylene glycol and similar bivalent alcohols with preferably not more than 5 carbons in the molecule and a higher boiling point than water. With cosmetic and therapeutic applications of these compounded horse chestnut extracts, the alcohols must naturally be therapeutically compatible.

EXAMPLES 2 TO 5

In these examples, 100 g. horse-chestnut seed meal from peeled seeds with a water content of not more than 5% were immersed in a beaker with extraction agent and allowed to stand at room temperature for 3 hours with occasional stirring. Then the mixture was drawn off and the extract tested for dry substances and escine. The escine content test, expressed as usual in HJ units was carried out according to the Büschi method, but with scrubbed erythrocytes instead of the blood containing serum used by Büschi. The extracting agents used in the four tests and the yields are shown in the following Table I. All four extracts may be processed as in Example 1 to therapeutically or cosmetically usable solutions or the like.

*Table I*

EXTRACTION TESTS WITH HORSE-CHESTNUT SEED MEAL (100 G.)

| Extraction agent | | Amount of extract cc. | Dry content, percent | Dry extract yield with HJ 50,000, percent |
|---|---|---|---|---|
| II | Anhydrous methanol | 170 | 7.65 | 17 |
| III | 70% ethanol+10% by vol. propylene glycol. | 450 | 7.1 | 30 |
| IV | 70% isopropanol+10% by vol. propylene glycol. | 324 | 8.0 | 28 |
| V | Propylene glycol | 70 | 28 | 25 |

The chestnut seed extracts containing propylene glycol according to the invention have, compared with similarly produced horse chestnut seed extracts without propylene glycol, the surprising property of giving with ultra-filtration through a cellophane membrane a much higher escine content in the filtrate.

EXAMPLE 6

A specimen of the oil-free extract prepared according the Example 1 was dried under vacuum. 50 g. of this dry extract were dissolved in 1000 cc. of the solvents shown in following Table II and placed in a cellophane bag, suspended over a collecting vessel in a closed chamber. The filtrate passing through the cellophane membrane under its own pressure and without additional suction was tested for escine according to the pre-cited improved Büschi method. The results are shown in Table II.

*Table II*

ULTRAFILTRATION OF EXTRACT SOLUTIONS

| Solvent | Filtrate after 3 days, cc. | Escine content, percent |
|---|---|---|
| Water | 4.0 | 0.56 |
| 70% ethanol | 13.2 | 0.5 |
| 70% ethanol+10% propylene glycol | 2.5 | 3.0 |

This table shows that the propylene glycol content increases the diffusibility of the escine complex by about a factor of 5, compared with pure water and by a factor of 6 compared with aqueous alcohol. Obviously, there is an interaction between the escine complex and the propylene glycol, causing the nature of the escine complex and its colloidal properties to change.

The effects of the propylene glycol on the escine complex present in the extract may also be seen from the reaction between escine and cholesterine. Saponine and cholesterine are known to form addition compounds which are insoluble and form quickly in solution. If, however, propylene glycol is added to the saponine solution, the precipitation is considerably delayed and reduced, under otherwise equal conditions.

Extensive dermatological and clinical tests have shown that the horse-chestnut extracts according to the invention, containing propylene glycol are suitable also for the treatment of the following cosmetic skin defects and diseases:

Cosmetic defects:
  Slack and/or wrinkled skin
  Skin impurities, i.e., reddish or bluish venes visible through the skin.
Dermatological defects:
  Ulcus cruris
  Varicosis
  Chronical thrombophlebitis with acute shifts
  Oedemes based on damaged venes
  Traumatic oedemes and haematomes
  Acne vulgaris
  Nyogelosis
  Dry, rheumatic circulatory defects
  Small joint arthroses
  Other damages and disturbances of the supporting and fibrous tissue of the body In all these cases, the extract of the invention is applied only externally, such as in the form of embrocations, packs or otherwise.

The solutions adapted to be rubbed into the skin have preferably concentrations of about 5% dry extract, and are used in amounts of 2–20 cc. once or several times per day. Also solutions with higher dry contents may be used, but are less convenient owing to the less easy distribution and dosage on the skin. In baths lower concentrations are used, and in packs with depositing effect higher concentrations. The extracts may also be combined with other active substances.

The extracts of the invention avoid practically the limitations to concentrations and dangers which usually restrict the oral and especially parenteral application. The ease of the transcutane application is the more surprising as saponines applied by injection subcutaneously or intravenously produce malignant necroses. The sapoines are inherently toxic, and the insensitivity of the skin to aqueous saponine solutions can be attributed only to the fact that the epidermis forms a carrier to the passage of saponines in aqueous solution. With the unprotected epithelium of the mucous membrane, irritations results even with low concentrations and higher concentrations produce serious damage. Thus, not only is it surprising that the epidermis barrier may be overcome to a great extent by the additives according to the invention, but the non-irritating compatibility is even more astonishing.

Thus, the object of producing saponine extracts passing through the skin was by no means obvious.

The therapeutic reaction between the substances of the horse chestnut seed extract according to the invention and the skin, and the tissue under the skin is not yet fully clear. Probably, the pre-cited inhibition or reduction of the reaction between saponine and cholesterine may be important. There seems to be a slow depth effect which avoids the local accumulation of active agent concentrations. In addition, the phosphatides in the extract of the invention probably also participate in the physiological processes.

Some therapeutical applications of the diffusible complex according to the invention, containing escine, are described in the following:

The term "solution" used herein is meant to comprise a solution of 5% active agent in 10% 1,2-propylene glycol and 85% aqueous isopropanol (35/65).

*Indications.*—Small varicose veins, slight venous inflammation, venous blockages: 2–3 times per day 50 drops, applied by hand on the diseased spot. The intense effect of the embrocation is shown by the quick disappearance of the heaviness, the feeling of pressure and of the inhibitions to movement. Hard muscles, muscle strain (stiff back) pins-and-needles at night: 50 drops to be rubbed in morning and night. Result: Freedom from pain, relief and quick improvement in the physical mobility.

Juvenile acne: Surprising good results by 2–3 times daily swabbing of the affected parts of the face with cotton wool steeped in the solution, continued for several days. Application in the evening to be preceded by washing the face with mild soap.

Varices: These bluish-red patterns, mainly on the thighs react well to embrocation with the solution, if the treatment is carried out rigorously for some time.

Chronical leg ulcers: A piece of linen, folded four times, is wetted with the solution, placed on the ulcer, covered with rubber, oil-paper or a cellophane foil. Renew twice daily (later once per day) until the ulcers have closed. With fresh leg ulcers the piece of material is conveniently applied only after allowing the alcohol to evaporate for a few minutes. This prevents irritation of the fresh wound. Both the embrocation and the dressing have no disadvantageous results. The preparation should not be used if the skin has been damaged by eczema.

The compound according to the invention is suitable not only as embrocation, but also in water-diluted form as additive to baths, compressions, and the like. In these cases, conveniently a solution is used containing double the active amount, that is to say, 10% active agents. This richer composition will be referred to hereinafter as concentrated solution.

*Indications for medical partial baths.*—Large varicose veins, chronical inflammation of the veins with all accompanying phenomena, extensive local oedemes, such as after sprains and contusions, haemorrhages, acroasphyxia, swollen hands and arms, after removal of plaster on calves and lower arms after fractures.

Instructions: 10 cc. conc. solution to 5–7 litres water at 38–40° C.; bathing period: 10 minutes. Baths to be taken every other day, later once a week. With extensive damage daily baths may be expedient, according to doctor's decision. With fresh inflammation of the veins, an addition of conc. solution to the usual cooling cataplasms is recommended, viz., half a division (=5 cc.) to about 5 litres water.

*Indications for wet packings.*—Small local swellings, for example, after sprains, contusions of ankle or knee joint with swelling (sport injuries), tenosynovitis.

Instructions: 10 cc. conc. solution to 1 litre hot water, immerse bandage, wring out slightly, apply and cover with wool. The bandage should remain for 2 hours and should initially be repeated every day. Use always a fresh, dry bandage. The prepared solution may be kept for about one week and may, therefore, be used several times.

The timely treatment of fresh swellings after sprains, contusions and the like with concentrated solution prevents later damage, such as long-lasting swellings, oedemes and local circulatory damages.

During the further execution of the processes leading to the production of extracts with easily diffusible active agents resulted in observations which are described in the following and appear to expalin the reaction mechanism which leads to the increase in the diffusibility of the active agents of the extract.

A possible, but by no means definite or even restrictive theory, based on present-day knowledge is that the polar, organic liquid, fully miscible with the extract, for example, propanol glycol, forms a complex with the active agent extracted from the horse-chestnut seed. In our present knowledge, this complex consists of escine, flavonoles and phosphatides as desirable, pharmaceutically important components, and of pharmaceutically unimportant and even undesirable impurities of sugar character. This ballast could not hitherto be separated so that dry horse-chestnut extracts contained only a few percent escine.

According to the present invention, these impurities may be replaced to an unexpectedly high degree by propylene glycol or the like and an active substance complex may be formed which diffuses on one hand more easily across a semipermeable, especially living membrane, and has, on the other hand, a substantially higher active content, and especially escine content in the dry matter.

In addition, the invention makes it possible to produce extract solutions having a very high escine content relative to the polar, high boiling point, organic liquid contained therein per unit of quantity. This extract solution rich in active agents is obviously of great advantage for pharmaceutical purposes. Compared with pure escine the low-ballast, rich-escine active complexes have the great advantage of durability in solvents, resistance to storage, which escine is known not to have.

The present invention consists therefore in improving the method for producing durable horse-chestnut seed extracts containing saponin, in which the extraction material is treated in the absence of water by a non-toxic alcohol of the 1,2 propylene glycol, 1,3-butylene glycol, glycerine, and beta-pyridine carbinol group and—related to this alcohol—five to fifty times the volumetric amount of an aliphatic compound of low monovalent alcohols with 2–5 carbons, ketones with 2–5 carbons or chlor methane, which are miscible with the non-toxic alcohol and have a lower boiling point than the same.

The characteristic of the extraction method is, therefore, that:

(1) The medium is practically anhydrous so that the sugar-type impurities cannot pass into the extract;

(2) It contains a comparatively small proportion of the non-toxic alcohols entering according to the pre-cited theory into the complex, and contained therein only in small amounts;

(3) For the purposes of facilitating the manufacture a liquid increasing the extraction medium is added which is capable of dissolving the active complex, but not the displaced impurities.

Usable specific solvents or diluents in this sense are ethanol, isopropanol, butanol, amyl alcohol, representing the lower monovalent alcohols, acetone and methylethyl ketone, representing the ketones with 2–5 carbons and methylene chloride and chloroform, representing the methane chloride.

In a preferred embodiment of the invention, the extraction material is treated with a mixture of propylene glycol and about six times the volumetric amount of a methane chloride of the group comprising methylene chloride and chloroform. Extraction liquids of this composition result in a particularly high escine content in the dry extract.

Very high escine contents in the dry matter may also be obtained by treating the extraction material with a mixture of propylene glycol and about three times the volumetric amount of (absolute) ethanol. This mixture should therefore be preferred. Similar results are obtained with 1,3 butylene glycol, glycerine and beta-pyridine-carbinol and one of the above-mentioned solvents or diluents.

As already mentioned, the constituents must be miscible and must have different boiling points so that the diluent may be removed after the extraction without noticeable loss of non-toxic alcohol so that the usable end product contains substantially only the active complex and the non-toxic alcohol.

However, the invention is not restricted to an end product free from or low in diluents. For example, with the use of water-soluble diluent it is possible to use the non-concentrated liquid extract for medicinal baths.

The execution of the improved extraction method of the invention, yielding an improved active complex, may be effected by two means. One method comprises the treatment of the extraction material with an extraction liquid, containing both constituents, viz., the non-toxic alcohol and the superfluous diluent.

Another method for carrying out the extraction comprises the treatment of the extraction material first with a non-toxic alcohol, the surplus of the aliphatic compound is then added step by step to the extraction solution, the gradually forming precipitate is removed and the aliphatic compound is evaporated from the clear solution. Experience shows that the second method gives the possibility of controlling to some extent the composition of the end product in the sense of primarily dissolved, more or less undesirable substances. It has been shown that the first precipitated fractions are practically free from escine. This fact seems to support the pre-cited theory about the mechanism of the extraction according to the invention. In this second method of the extraction, the use of methylene chloride as diluent or precipitant has been particularly useful.

The term "Extraction material" is used in this specification in a wide sense. The production of the extract according to the invention is not restricted to horse-chestnut seed material as such, for example as meal, but comprises also as extraction material the dry substance of a horse-chestnut seed produced by means of another extracting agent, consisting for example, of water, an aqueous low alcohol or water-like anhydrous methanol or containing at least one of these constituents.

The invention will now be further explained with reference to the following examples, which are not, however, in any way limitative, and may be modified in many ways without departing from the principle of the invention.

EXAMPLE 7

*Extraction of horse-chestnut meal with a mixture of aliphatic alcohol and diluent.*

Commercial horse-chestnut meal is first dried until it is practically free from water, finely ground and the seed oil is removed by carbon tetrachloride. Always 5 g. of this purified, dry meal, having according to the pre-cited, modified, Büschi method about 2.5% escine content, are mixed with 20 cc. extracting agent and left to stand for two days under frequent agitation. An aliquot portion of the extraction liquid purified by filtering the escine content is determined by the Büschi method. The following Table III gives the composition of the extraction agent and the escine yield.

*Table III*

[5 g. horse chestnut meal per test, containing 125 mg. escine (100%) with 20 cc. liquid, standing for 2 days under frequent agitation]

| | 0% | | 2½% | | 7.5% | | 15% | | 22½% | | 40% | |
|---|---|---|---|---|---|---|---|---|---|---|---|---|
| Methylethyl ketone | | | 1.5 | 5 | 1.5<br>3 | 10 | 3 | 8 | 42 | 17 | 60 | 13 |
| Acetone | 0.4 | 6 | 4 | 11 | 10<br>1.5<br>10 | 16<br>7<br>11 | 18<br>12<br>14 | 17<br>14<br>12 | 45 | 18 | 60 | 14 |
| Amyl alcohol | | | 0.8 | 3 | 0.7<br>3 | 7<br>11 | 1 | 8 | 2 | 8 | 35 | 9 |
| Butyl alcohol | | | 1.5 | 5 | 1<br>3 | 7<br>11 | 2<br>60 | 10<br>18 | 30<br>85ˣ | 15 | 45 | 10 |
| Isopropyl alcohol | 1.8 | 8 | 3<br>18ˣ | 6 | 11<br>3<br>50<br>8 | 13<br>9<br>17<br>10 | 25<br>4<br>75<br>16 | 19<br>8<br>12<br>10 | 50<br>30ˣ | 16<br>21 | 80 | 17 |
| Ethyl alcohol | 6.4 | 9 | 8(45)<br>35ˣ | 8(13)<br>16 | 35<br>8<br>64<br>20 | 20<br>10<br>17<br>11 | 87ˣ<br>8<br>85<br>35 | 15<br>11<br>11<br>11 | 80<br>50ˣ<br>77ˣ | 24<br>12 | 83 | 18 |
| Methylene chloride | 0.0 | | 0.5 | 4 | 28<br>2<br>1.5 | 24<br>14<br>10 | 55<br>19 | 23<br>19 | 80 | 24 | 85 | 19 |
| Chloroform | 0.0 | | 1<br>0.5ˣ | 5<br>3 | 34<br>5<br>3 | 23<br>10 | 57<br>18<br>20ˣ | 25<br>22<br>30 | 80<br>28ˣ | 25<br>18 | 80 | 20 |
| Methyl alcohol | 57 | 8 | 60 | 8 | 66 | 9 | | | 71 | 11 | | |
| 65% aqu. isopropyl alcohol | 45 | 4.7 | | | 45 | 4.5 | | | | | | |
| 70% aqu. ethyl alcohol | 45 | 5.4 | | | | | | | | | | |
| 30% aqu. ethyl alcohol | 57 | 4.5 | | | | | | | | | | |

High b.p. alcohol

Left-hand group in each box: Escine in 20 cc. in percent related to 125 mg. Escine.
Right-hand group in each box: Escine content in percent in dry matter.
Top row in each box: 1,2 propylene glycol.
2nd row in each box: 1,3 butylene glycol.
3rd row in each box: Glycerine.
4th row in each box: Beta-pyridine carbinol.
Values marked ˣ were obtained by extraction under heat.

In this test series according to Example VII, the known extraction media containing water were compared with extraction media which contain either only the diluent component of the extraction medium of the invention, or both components at different ratios. The escine yields show clearly that escine may be substantially removed from the horse-chestnut meal, but simultaneously the amounts of impurities passing into the liquid are so large that the escine ratio in the dry extract is very low. Similar figures, although with a slightly more favourable escine content of the dry matter are obtained with anhydrous methanol.

With the exception of absolute ethanol, the anhydrous diluents have no or only very low extraction capacities and the escine content in the dry matter is very low. However, as soon as the second component according to the invention that is to say, the constituent entering into the complex, is present in comparativily small quantities (in the test, substantially about 10% by volume) in the extraction medium, the escine content in the dry matter rises to a multiple. This increased absorption of escine is surprising, especially with extraction media containing chloromethane, because the pure chloromethanes cannot dissolve escine at all.

Regarding the test yields produced with propylene glycol and similar complex-changing compounds, unusually high-escine dry products may be obtained, but the manufacturing use of this comparativily high-boiling point extraction medium is rather more expensive.

Naturally, the state of equilibrium between the extracted components of the meal and the extraction medium may be accelerated by carrying out the extraction at higher temperatures below the boiling point of the diluent.

EXAMPLE 8

This example clarifies the processes occurring during the gradual addition of diluents to extracts, produced with pure complex-changing compounds.

The escine-containing starting material was dry extract produced by treating commercial horse-chestnut meal with 60% isopropyl alcohol. This dry matter has an escine content of about 5%.

1.9 g. of this dry extract were dissolved in 20 cc. propylene glycol. Certain amounts of chloroform were added to this solution in four successive stages, the solution was allowed to stand over day or night, the precipitate was removed, further chloroform was added, allowed to stand, this process was repeated until the total amount of extraction liquid was about 800 cc.

The following Table IV shows for the individual stages the amounts of chloroform added, the amount of precipitate, the escine content in the dry precipitate, and the calculated amounts of escine in this precipitate.

*Table IV*

FRACTIONATING PRECIPITATION 1.86 g. dry matter with 100.0 mg. escine=5.2% escine were dissolved in 20 cc. 1,2 propylene glycol.

Fractionating precipitation with:

(a) 100 cc. CHCl₃ precip.: 111 mg. dry subst.—0.05% escine=0.05 mg.
(b) +50 cc. CHCl₃ precip.: 190 mg. dry subst.—0.45% escine=0.85 mg.
(c) +150 cc. CHCl₃ precip.: 576 mg. dry subst.—2.3% escine=13.15 mg.
(d) +600 cc. CHCl₃ precip.: 557 mg. dry subst.—6.8% escine=38.80 mg.
(e) In the filtrate: 350 mg. dry subst.—12.1% escine=42.35 mg.

*Table V*

A mixture of 7 parts by volume 1,2 propylene glycol and 93 parts by volume chloroform saturated at 0° C. with dry horse-chestnut extract was divided into three vessels:

*1st vessel.*—Stored 8 days at 0° C.: The solution remained clear.

*2nd vessel.*—Slow heating: Turbidity starts at 35° C. and becomes dense at boiling point. After distillation of about half the volume, the liquid becomes again clear.

*3rd vessel.*—Stored 24 hours at 58° C. in closed vessel: Of 1.5 g. dissolved matter, 0.5 g. are precipitated on the bottom of the vessel.

Table IV makes possible the following conclusions regarding the possible efficiency of the diluent.

The complex-changing compound, viz., the propylene glycol, may dissolve the active complex which may be extracted by aqueous alcoholic extraction media from horse-chestnut seed meal. However, in this liquid propylene glycol-active agent system there occurs a chemical process so that with the addition of a diluent, such as chloroform, which, as shown in Example 7, has no dissolving capacity for the active agent, there is not produced a precipitate corresponding to the normal active complex, that is to say, containing escine, but a precipitate which is initially practically free from escine. Only with a considerable excess of diluent or precipitant, escine may be detected also in the precipitate. A large portion of the originally present escine remains in the ultimate highdiluent extraction liquid and represents, as shown by the analysis of the dry matter, a main constituent of the remaining solid component. Also this test series is based on the pre-cited theory, that there is formed between propylene glycol and especially escine, a complex compound which is both stable and soluble in the system, which does not act as solvent for the normal horse-chestnut active agent containing especially sugar impurities.

EXAMPLE 9

This example describes the temperature stability of a propylene glycol-active agent complex in a system containing additional diluent. If this system of Table V, containing horse-chestnut active agent, propylene glycol and chloroform, is heated, there occurs a turbidity, containing up to about one third of the solid component. With agitation or stirring, this turbidity disappears completely, when the system is cooled. This redissolubility is reduced or removed only by coagulation due to prolonged heating, that is, by a reduction of the surface, inhibiting the redissolution. If, however, a part of the chloroform is allowed to escape during the heating, the original, coarsely dispersed precipitate disappears with increasing enrichment of the propylene glycol in the system, even in the presence of heat. This reversible thermal solubility of the horse-chestnut active agent complex in a propylene glycol-chloroform system seems to indicate that with normal temperature, the propylene glycol active complex soluble in the chloromethane is the more stable, the lower is the system temperature. With higher temperature, it becomes instable, because chloromethane has in heat relative to propylene glycol a much higher solubility coefficient than when cold. However, according to the removal of chloromethane by distillation, corresponding amounts of propylene glycol are liberated and may form a complex with the escine and the like so that amount of low-propylene glycol complex insoluble in chloromethane, due to the propylene separation, is reduced and a high-propylene glycol, chloromethane-soluble complex is reformed.

The preceding examples show, therefore, clearly that there occurs a chemical reaction between the pre-cited multivalent alcohols or the beta-pyridine carbinol on one hand and the escine-containing active agent of the horse-chestnut seed on the other hand.

What we claim is:

1. A method for producing durable percutaneously administerable extracts containing escine from horse-chestnut seed substance comprising the step of reacting the native escine-containing complex contained in said horse-chestnut seeds with lower aliphatic polyvalent alcohols having from two to three hydroxyl groups in the molecule.

2. A method as claimed in claim 1 in which said aliphatic polyvalent alcohol is selected from the group consisting of propylene glycol, 1,3-butylene glycol and glycerine.

3. A method as claimed in claim 1 in which the horse-chestnut seed substance is extracted with propylene glycol.

4. A method as claimed in claim 1 in which substantially anhydrous horse-chestnut seed substance is extracted with substantially anhydrous methanol at temperatures below 30° C., removing the methanal from the extract, and dissolving the methanol-free extract in an aliphatic polyvalent alcohol selected from the group consisting of propylene glycol, 1,3-butylene glycol and glycerine.

5. A method as claimed in claim 1 in which the horse-chestnut seed substance is extracted with a mixture comprising a lower aliphatic monovalent alcohol having from two to three carbon atoms in the molecule, propylene glycol and an amount of water such that the extract is substantially free from albumin and tannins.

6. A method as claimed in claim 1 in which the horse-chestnut seed substance is extracted in the absence of water with a mixture comprising low aliphatic polyvalent alcohols selected from the group consisting of propylene glycol, 1,3-butylene glycol, and glycerine and about 3 to 50 times the volumetric quantity of an aliphatic compound selected from the group consisting of lower aliphatic monovalent alcohols having from two to three carbon atoms in the molecule, ketones having from 2 to 5 carbon atoms in the molecule, and chloromethanes, which are miscible with said polyvalent alcohol and have a lower boiling point than said polyvalent alcohol.

7. A method as claimed in claim 6 in which the horse-chestnut seed substance is extracted in the absence of water with a mixture comprising propylene glycol and about six times the volumetric quantity of a chloromethane selected from the group consisting of methylene chloride and chloroform.

8. A method as claimed in claim 6 in which the horse-chestnut seed substance is extracted in the absence of water with a mixture comprising propylene glycol and about three times the volumetric quantity of ethanol.

9. A method as claimed in claim 6 in which the horse-chestnut seed substance is extracted in the absence of water with said aliphatic polyvalent alcohol, digesting the resulting extraction solution with a surplus amount of said aliphatic compound whereby a precipitate is formed, removing the resulting precipitate and thereafter evaporating the aliphatic compound from the clear solution to give an extract rich in escine.

10. The saponine containing extract as prepared by the method of claim 1.

11. The saponine containing extract as prepared by the method of claim 4.

12. The saponine containing extract as prepared by the method of claim 6.

References Cited by the Examiner

UNITED STATES PATENTS

| | | | |
|---|---|---|---|
| 2,780,620 | 2/57 | Krider | 260—210.5 |
| 2,790,793 | 4/57 | Boedecker | 260—210.5 |
| 2,791,581 | 5/57 | Wall | 260—210.5 |
| 2,852,434 | 9/58 | Taylor | 167—90 |
| 2,876,164 | 3/59 | Wershaw | 167—90 |

OTHER REFERENCES

Ludewig et al.: "Chem. Abst.," vol. 53, 1959, p. 7291(g).

LEWIS GOTTS, *Primary Examiner.*

JULIAN S. LEVITT, *Examiner.*